United States Patent [19]

Kashima et al.

[11] Patent Number: 5,133,529
[45] Date of Patent: Jul. 28, 1992

[54] SEAT DAMPER

[75] Inventors: Mitsuhiro Kashima; Nobumichi Hanawa, both of Gifu, Japan

[73] Assignee: Kayaba Kogyo Kabushiki Kaisha, Tokyo, Japan

[21] Appl. No.: 571,176

[22] Filed: Aug. 21, 1990

[30] Foreign Application Priority Data

| Aug. 22, 1989 | [JP] | Japan | 2-215632 |
| Aug. 22, 1989 | [JP] | Japan | 1-215633 |
| Aug. 22, 1989 | [JP] | Japan | 1-215634 |
| Jan. 29, 1990 | [JP] | Japan | 1-18198 |

[51] Int. Cl.⁵ ............................................. F16M 13/00
[52] U.S. Cl. .................................. 248/562; 248/162.1; 248/622; 248/631
[58] Field of Search ............ 248/562, 631, 161, 162.1, 248/404, 566, 622

[56] References Cited

U.S. PATENT DOCUMENTS

| 3,711,054 | 1/1973 | Bauer | 248/562 |
| 3,787,019 | 1/1974 | Freitag | 248/562 X |
| 3,788,587 | 1/1974 | Stemmler | 248/562 |
| 3,921,952 | 11/1975 | Wirges | 248/631 |
| 3,966,182 | 6/1976 | Stadelmann et al. | 248/631 X |
| 3,995,824 | 12/1976 | Bauer | 248/631 |
| 4,108,416 | 8/1978 | Nagase et al. | 248/631 X |
| 4,842,238 | 6/1989 | Toiyama | 248/161 X |
| 4,979,718 | 12/1990 | Bauer et al. | 248/631 |

*Primary Examiner*—David L. Talbott
*Attorney, Agent, or Firm*—McGlew & Tuttle

[57] ABSTRACT

This invention relates to a seat damper which is adaptable for a seat supporting mechanism for a motor boat and the like. The damper has a supporting column structure and a lower bracket, the supporting column structure is comprised of an outer tube, a damper cylinder arranged within the outer tube, a hollow piston rod movably inserted into the damper cylinder through a piston, an attenuation force generating mechanism arranged within the damper cylinder and a height adjusting mechanism, and the supporting column structure is removably inserted into the lower bracket and fastened by a fastening member. The supporting column structure can be made into a cartridge form and the lower bracket can be standardized.

8 Claims, 8 Drawing Sheets

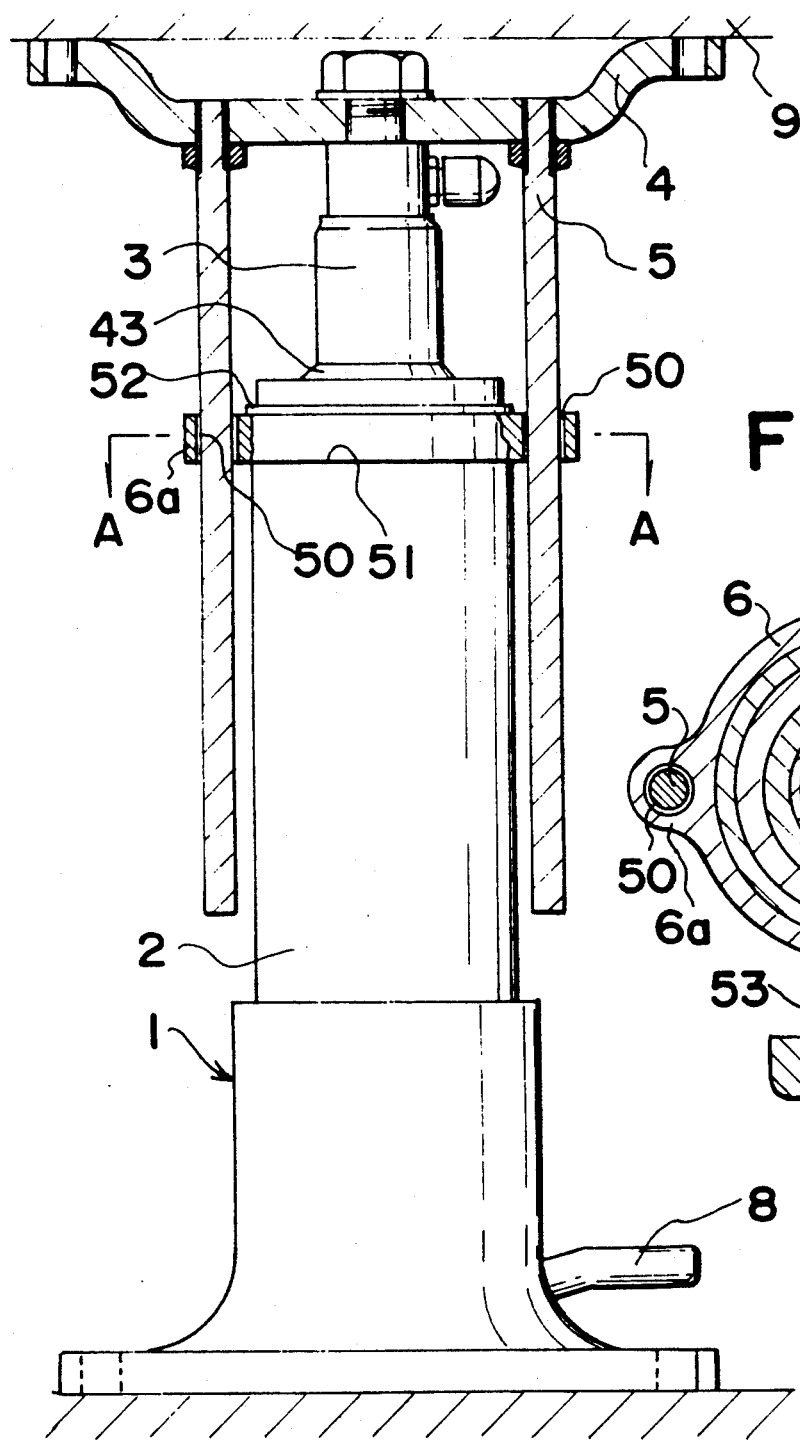
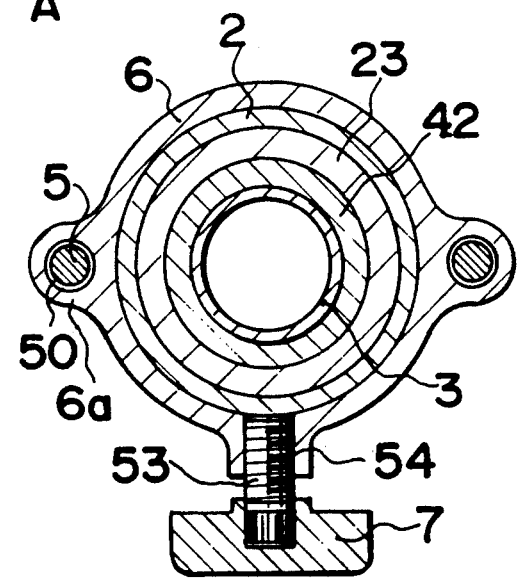

SEAT DAMPER

BACKGROUND OF THE INVENTION

1. Field of the Invention

This invention relates to a seat damper and in particular to a seat damper to be employed in a seat supporting mechanism for a small-sized and high-speed boat such as a motor boat or the like.

2. Description of the Prior Art

A hull of a small-sized ship such as a motor boat may receive a repetitive and continuous shock during its high speed running from a striking of the bow against the wave or a severe striking of the bottoms against the water surface. In addition, an intensity of the striking force during this running operation reaches such an extent that an occupant has to get an anti-shock attitude even in case of his seating on the seat.

Due to this fact, there are many seats for the type of ship as described above which are provided with a supporting column structure having a spring type or an oil type damper mechanism or the like.

For example, as its practical means, the prior art supporting column structure is, as disclosed in the specification of U.S. Pat. No. 4,842,238, constructed such that the column structure is composed of a cylindrical lower bracket having a widened bottom part for making a stable installation at an installing bottom surface. An inner tube slidably inserted into the lower bracket, and a damper arranged within the inner tube, wherein the inner tube is operated to move up and down under an action of the damper so as to absorb or damp energies such as striking and vibration or the like applied from the external side to the seat.

According to the configuration of the supporting column structure composed of such a prior art means, an inner diameter part of a receiving cylinder for a lower bracket for directly fitting and sliding the inner tube should be finished to have a high precision and this causes a cost of the system to be increased. Further, employment of this type of supporting column structure in various configurations having different damper strokes requires an arrangement of exclusive lower brackets for each of the machine types in the prior art where the lower bracket acts as the outer tube. Even then such a prior art configuration means did not show any convertibility of the lower bracket between the machine types and this causes additional costs.

SUMMARY OF THE INVENTION

It is an object of the present invention to provide a seat damper having a high valuable as a product by improving a structure which may cause an increased cost.

It is another object of the present invention to provide a seat damper having a superior versatility and, easy maintenance and easily repaired. Some supporting column structures of the seat dampers have different damper strokes and are made as cartridges. These cartridges can be replaced with each other by standardizing the lower brackets.

It is still another object of the present invention to provide a seat damper in which precision secondary work is not needed on the lower bracket and therefore machining cost can be reduced.

It is still yet another object of the present invention to provide a seat damper in which not only an absorption of shock but also a height adjustment and altering of direction can be performed.

It is still another object of the present invention to provide a seat damper with a high vibration absorbing capability without having any relation to the size of amplitude.

In order to accomplish the above objects, the configuration of the present invention is made such that the supporting column structure connected to the seat and the installing lower bracket are separated from each other. The supporting column structure is telescopic and an attenuation force generating mechanism is formed in the column supporting structure. An important feature is that the lower bracket is made as a standardized unit and is provided with fastening members for use in fastening the supporting column structure removably inserted in it.

With the foregoing arrangement, according to the present invention, it may have the following actions.

For example, a height of the seat connected to the upper part of the piston rod is optionally adjusted in advance by a height adjusting mechanism.

When a person sits on the seat or when an external shock or vibration is delivered to the seat, these energies are absorbed and damped with an attenuation force generating mechanism.

The column supporting structure is inserted into the lower bracket like a cartridge and fastened with a fastening member and in case of replacement and repairing work, the fastening member can be loosened and the cartridge easily removed.

BRIEF DESCRIPTION OF THE DRAWINGS

FIG. 3 is a partial longitudinal enlarged front elevational view in section of FIG. 1.

FIG. 4 is a top plan view in cross section taken along a line A—A of FIG. 3.

DESCRIPTION OF THE PREFERRED EMBODIMENTS

Referring now to the accompanying drawings, some preferred embodiments of the present invention will be described.

Figure 1:
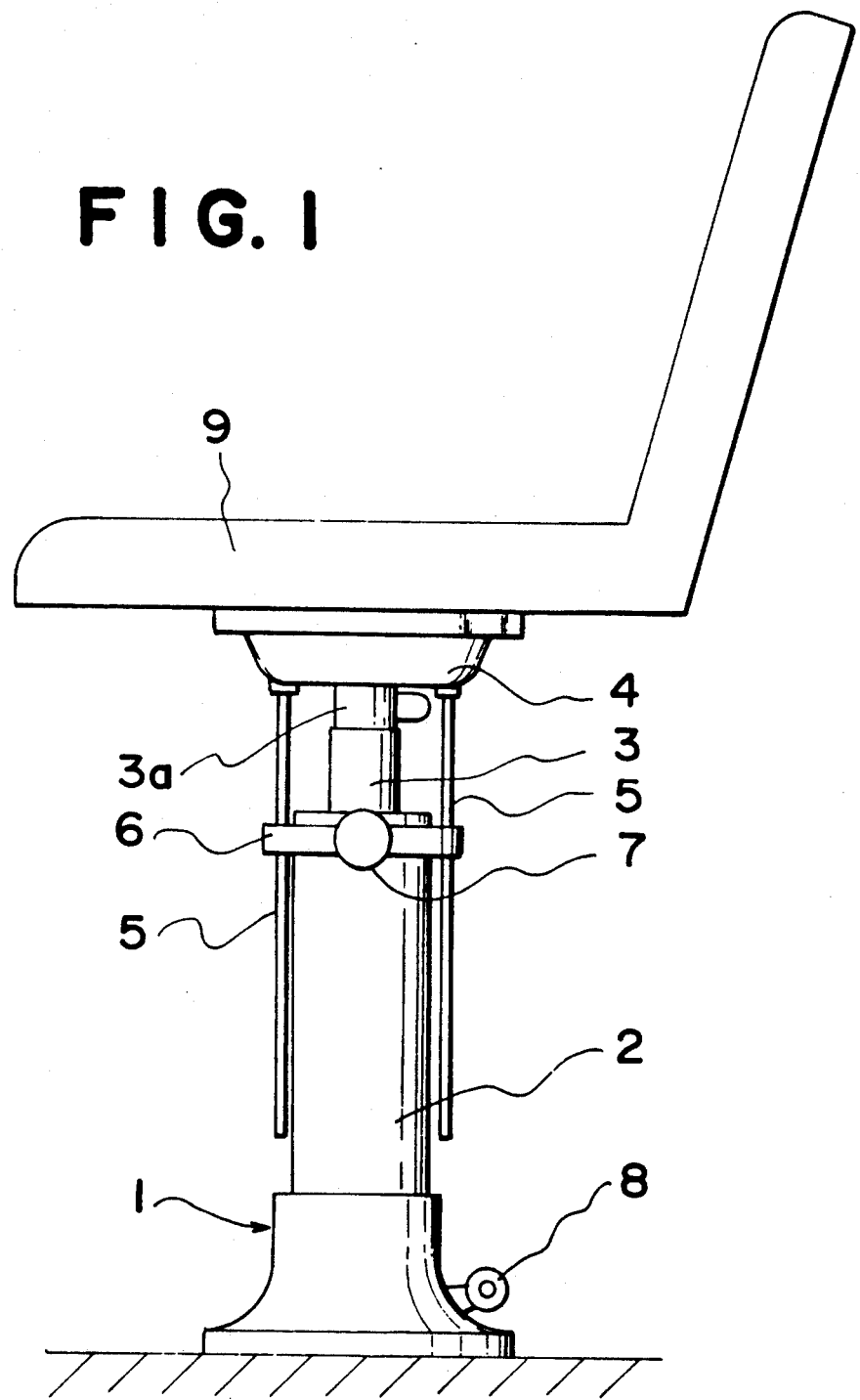
FIG. 1 is a front elevational view for showing a seat damper of one preferred embodiment of the present invention.

FIG. 1 is a side elevational view for showing a fixed state of one preferred embodiment of the present invention. An outer tube 2 is fitted and installed to an installing lower bracket 1 fixed to the mounting surface and then it is integrally assembled by means of a bottom fastening bolt. An inner tube 3 of a hollow piston rod is slidably fitted from above the outer tube 2 in a vertical oriented manner. A seat receiving upper bracket 4 is fixed to an upper end cap 3a of the inner tube 3, and then one or more bolts 5 are suspended from symmetrical positions of the lower surface of the upper bracket 4.

Free extreme ends of the bolts 5 and 5 are slidably inserted into a ring-like member 6 which is rotatably attached in a circumferential direction at an outer circumference of an upper edge of the outer tube 2. Reference numeral 7 denotes a threaded operating knob, reference numeral 8 denotes an outer operating level for a valve to be described later and reference numeral 9 denotes a seat, respectively.

Figure 2:
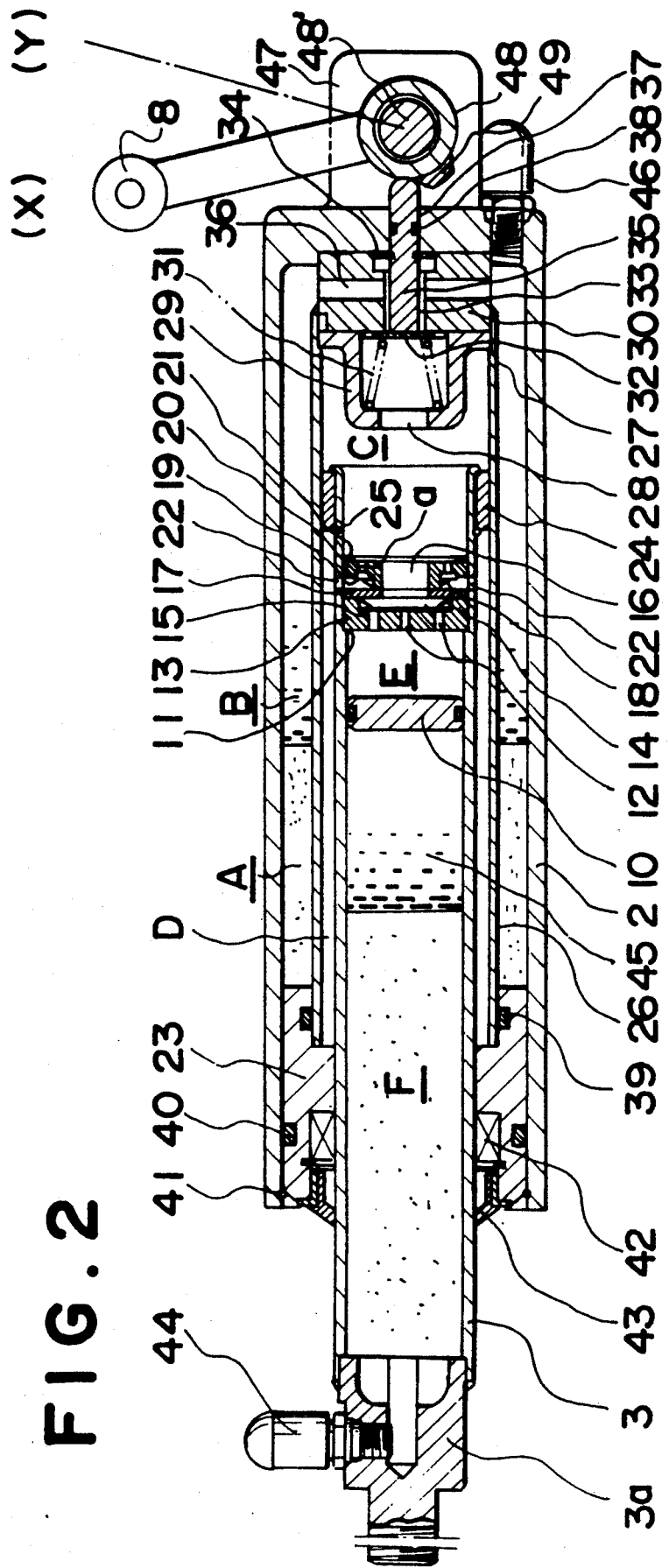
FIG. 2 is an enlarged front elevational view in section for showing the supporting column structure shown in FIG. 1.

FIG. 2 is a longitudinal side elevation in section for showing a supporting column structure to show one example of an oil cylinder mechanism installed between the outer tube 2 and the inner tube 3. The inner tube 3 has the upper end cap 3a and is composed of a hollow piston rod. A free moving piston 10 is arranged within the hollow part and in turn a shielding plate 13 having several orifices 12 is placed at an inner circumferential step 11 near the inserting end of the tube 3 as an attenuation force generating mechanism. A leaf valve 16 biased in a closing direction by a leaf spring 14 is abutted against a rear side surface of the shielding plate 13. A spring stopper plate 17 having a through-hole for forming a central passage 16 is placed next and there are provided leaf valves 19 having orifices biased by the leaf spring 18. A valve case 20 is provided with ports (a) to be opened or closed by the leaf valve 19. This valve base 20 has a central passage 16 and is integrally assembled by a stopper ring 21.

In this assembled state, side holes 22 at a circumferential wall of the inner tube 3 are opened toward a vacant place adjacent to the leaf valve 19 forming a flow passage communicating the hollow part within the tube with the outside part of the tube.

After this inner tube 3, constructed as above, is passed through a bearing 23 not assembled at an upper end of the outer tube 2, a piston 24 is fixed to an extreme end and outer circumference of the inner tube 3 so as to be held between a stopper ring 25 and an end edge of an expansion tube.

In turn, a damper cylinder 26 to which the piston 24 is fitted is separately prepared. In this cylinder 26, a circumferential edge of the spring housing 29, also acting as an oil lock piece having an opened central through-hole 28, is engaged with an inner circumferential step part 27 below an upper open end. A circumferential edge of a valve case 30 with its side surface being closely in contact with the former circumferential edge is welded to an end edge of the cylinder 26 to assemble them together. At this time, a check valve configuration in which a leaf valve 32 is biased by an expansion spring 31 is arranged within the housing 29 and is press fitted to an opening edge of the passage 33 of the valve base 30.

In addition, an operating rod 35 having a flange 34 is inserted into this valve case 30 and further there is provided a passage 36 of which one end communicates with the through-hole 33 and the other end is opened at the outside.

The cylinder 26 assembled with the bottom check valve is set within the outer tube 2 prior to the assembly of the inner tube 3. That is, the extreme end side of the operating rod 35, far from the flange 34, is inserted into the inserting hole 37 at a center of the bottom part at the outer tube 2, and placed to be slidable under a seal of O-ring 38. An outside part of the valve case 30 is abutted against the bottom part. The cylinder 26 is raised at the central part of the outer tube 2 and then a predetermined amount of operating oil is flowed into the cylinder 26 and a clearance between the cylinder 26 and the outer tube 2, respectively.

Under this condition, the bearing 23 covered on the inner tube 3 in advance is moved toward the upper end of the outer tube 2 at a position where the extreme end piston 24 of the inner tube 3 is slightly inserted into the cylinder 26 from the upper end of the opened cylinder 26 and further the bearing is press fitted there. The bearing 23 is installed at the upper end of the outer tube 2 as shown in FIG. 2 while the outer circumference at the upper end of the cylinder 26 is fitted under an arrangement of the O-ring seal 39 to an inner wall installing hole of the bearing 23. Then, this installation is sealed by an O-ring 40 and prevented from being pulled off by a stopper ring 41 and in turn the inner tube 3 passing through the bearing 23 may provide a sealing feature and a protection of a sliding surface under an assembly of the oil seal 42 and the dust seal 43.

Then, high pressure gas is fed from an air valve 44 fixed to the upper end cap 3a into the hollow tube part and a gas pressure chamber F and an oil chamber E are formed with a slight oil accumulation 45 being placed above the free piston 10 held therebetween.

Gas of predetermined pressure is fed into a reservoir chamber between the tube 2 and the cylinder 26 from the air valve 46 fixed to the bottom part of the outer tube 2 so as to form the gas chamber A and the oil chamber B and in turn, an interior space of the cylinder 26 is divided into an oil chamber C and an oil chamber D by the piston 24.

A cam 48 of the operating lever 8 rotatably pivoted to the link brackets 47 through a shaft 48' which is integral with the outer tube 2 are abutted against the extreme projecting end of the operating rod 35 projected out of the outer tube 2 from the cylinder 26. The cam projection 49 of the cam 48 is contacted with the rod 35 and when this is pushed up together with the leaf valve 32 against an operating force of the expansion spring 31, the check valve composed of the valve 32 is opened. The leaf valve 32, the operating rod 35, the cam 48 and the operating lever 8 constitute a height adjusting mechanism. One example of a rotation preventing mechanism is shown in a substantial longitudinal section of FIG. 3. The rotation prevention mechanism is operated such that the rods 5 are integrally fixed with the bracket 4 by threadably engaging the bolts at the upper ends of the rods to the rear side of the upper bracket 4. The suspended free lower ends are inserted into the inserting holes 50 formed at an expansion ear 6a (refer to the sectional view of FIG. 4) of the guide member 6 in such a way as it may be freely moved up and down. Assembly of the guide member 6 is carried out such that it may be slidably fitted in a circumferential direction to a fixing step 51 at an outer end outer circumference of the immovable outer tube 2 and is prevented from being pulled off by the stopper ring 52. The operating knob 7 fixed to the guide member 6 is constructed such that a set bolt 53 integrally formed to the knob is threadably inserted into a threaded hole 54 of the guide member 6, the operating knob 7 is rotated to cause the threaded extreme end of the set bolt 53 to be pressed against the outer circumferential wall of the outer tube 2. The guide member 6 kept rotatable in respect to the outer tube 2 up to now is fixed to be immovable with the tube 2.

Accordingly, in the case that a rotating angle of the seat 9 is to be adjusted, the operating knob 7 is rotated to loosen the set bolt 53 and to keep the guide member 6 rotatable. The seat 9 is rotated up to its desired angular position and thereafter the operating knob is operated again to fasten the set bolt 53, and the guide member 6, i.e. the seat 9 is fixed. Thereby the changing of the direction of the seat can be freely carried out.

Then, a connection between the supporting column structure and the lower bracket will be described.

The supporting column structure is comprised of, as described above, the outer tube 2, the damper cylinder 26 arranged in the outer tube 2 and the inner tune 3 of the hollow piston rod which is movably inserted into the damper cylinder 26 via piston 24, and further within the damper cylinder 26 are arranged an attenuation force generating mechanism composed of the leaf valve 15 or the like and similarly the height adjusting mechanism composed of the lower bracket 1 or the like. The lower bracket 1 is standardized and at the same time it is provided with a fastening member P for use in fastening the supporting column structure inserted like a cartridge manner through the outer tube 2.

Figure 5:
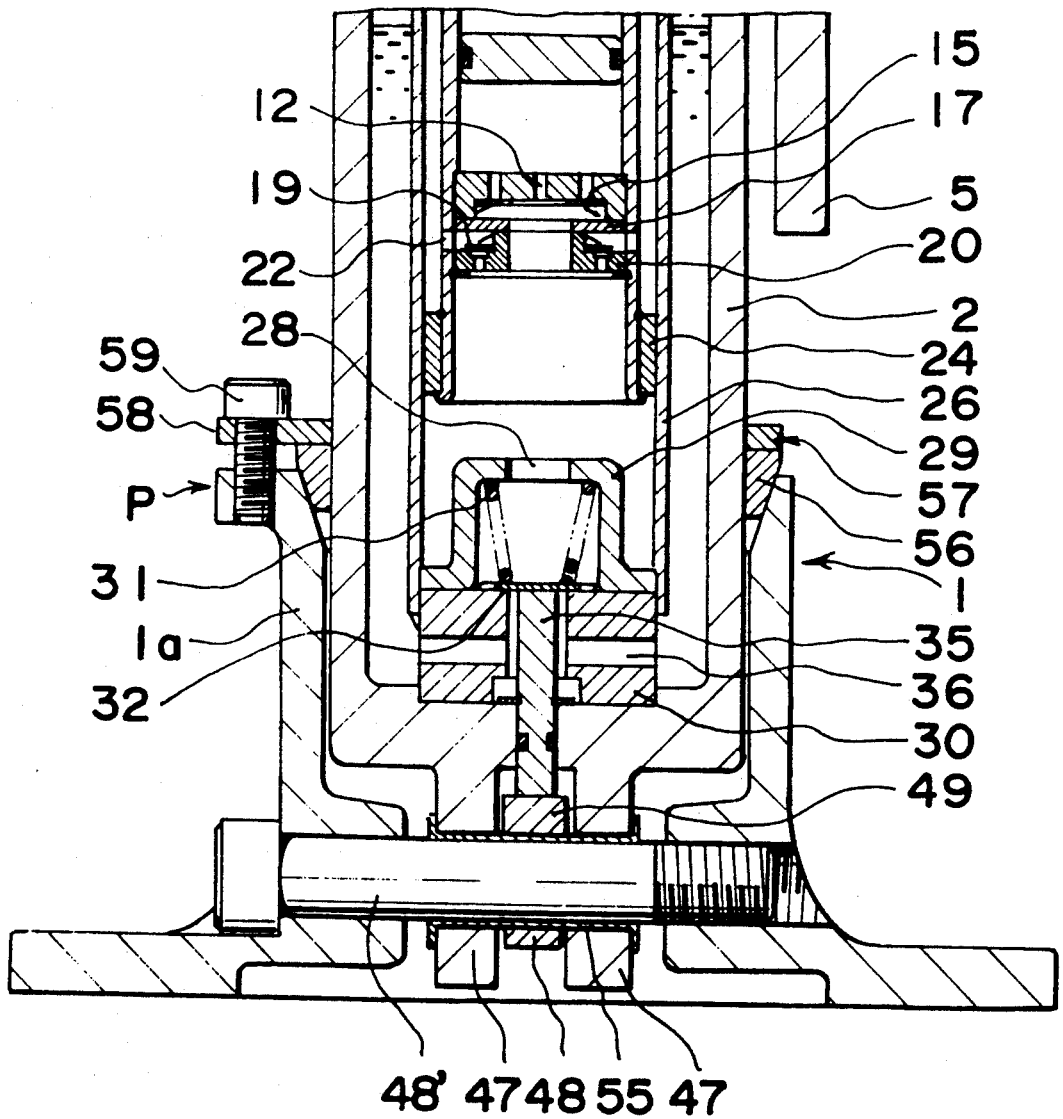
FIG. 5 is a partial longitudinal enlarged side elevational view in section of FIG. 1.

The present invention will be described in detail, wherein as shown in FIG. 5, the following configuration is employed for performing an assemblying of the lower bracket 1 and the outer tube 2. That is, a pair of link brackets 47 in parallel with the bottom part of the outer tube 2 are provided. The outer tube is inserted into the receiving cylinder part 1a of the lower bracket 1. The bearing 55 is placed in the through-holes of the ring brackets 47 and the shaft 48' is closely inserted into the bearing 55 so as to support the load including a weight of the mechanism at the supporting structure.

In turn, an upper end opening edge of the receiving cylinder 1a of the lower bracket 1 is formed as an expanded inner circumferential tapered surface. A ring 56 of which inner diameter is slightly larger than an outer diameter of the outer tube 2 and having an outer circumferential surface formed into a wedge-like section with a tapered surface, is made of resilient material such as resin or the like. There is provided a metallic flange ring 57 having a substantial same shape as that of the upper surface of the ring 56 and having expansion pieces 58 at three circumferential portions.

In case of inserting the outer tube 2 into the receiving cylinder 1a in the aforesaid lower bracket 1, the flange ring 57 and the ring 56 are inserted in sequence onto the tube 2, or the ring 56 and the flange ring 57 are placed as shown in FIG. 5 at the upper end edge of the tapered surface of the receiving cylinder 1a. The bolts 59 are threadably inserted into each of the threaded holes arranged at positions opposite to the bolt holes at the upper and outer circumference edge of the lower bracket 1 through the bolt holes opened in each of the expanding ear pieces 58 of the flange ring 57 under a load supporting support of the shaft 48' of the inserted outer tube 2. Then, the bolts are fastened to hold the ring 56 between the tapered surface of the lower bracket 1 and the flange ring 57.

The holding of this ring 56 is further compressed with a strong fastening of the bolts 59 and a resilient deformation of the ring 56 causes the inner circumferential surface of the ring 56 to be press-fitted to the outer circumference of the outer tube 2, so that a clearance between the tube 2 and the upper end edge of the receiving cylinder 1a is filled by the ring 56, resulting in that a lateral vibration of the outer tube 2 is prevented.

Other preferred embodiments of the present invention will be described.

Figure 6:
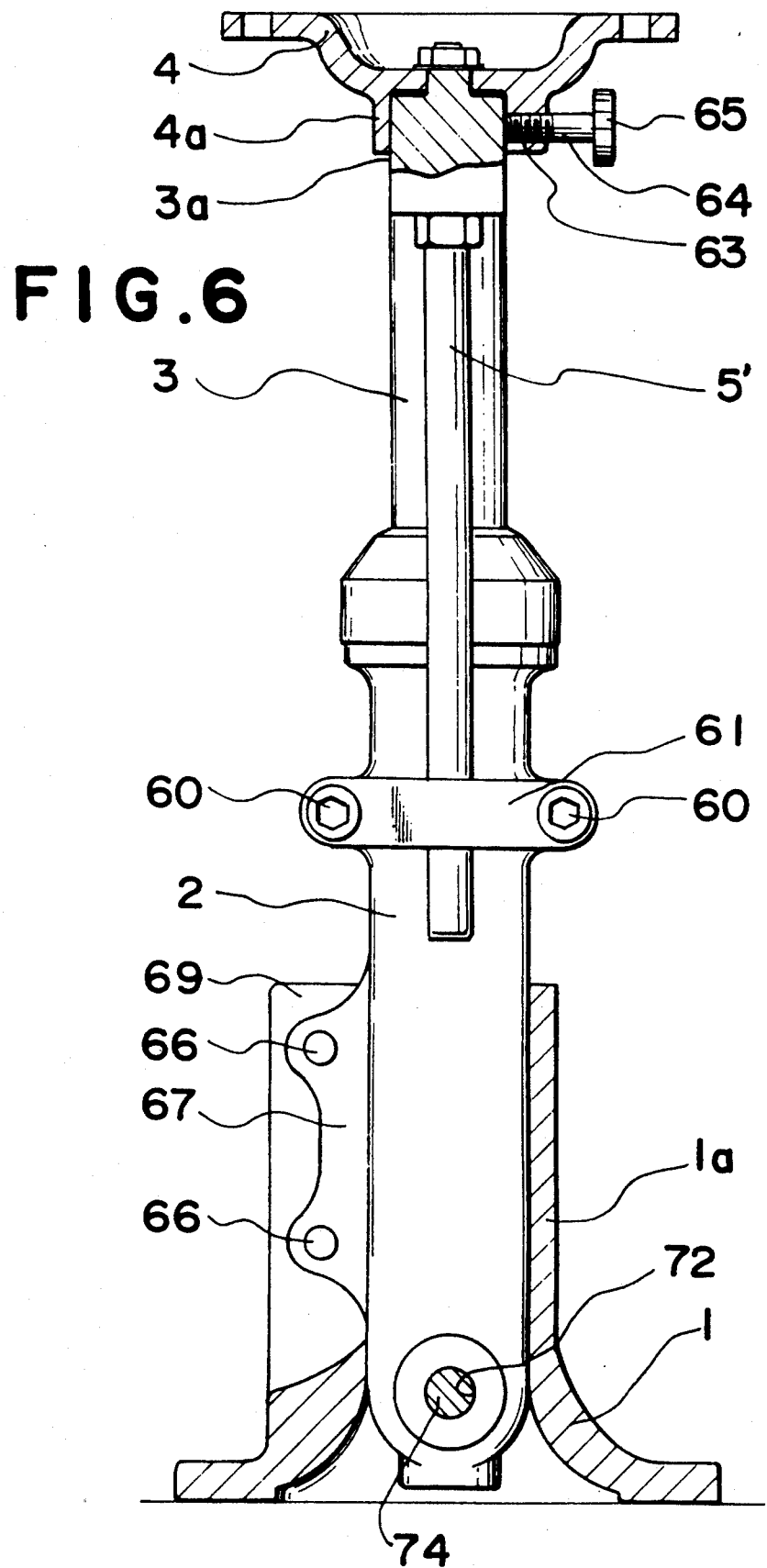
FIG. 6 is a front elevational view of a seat damper of another preferred embodiment of the present invention.
Figure 7:
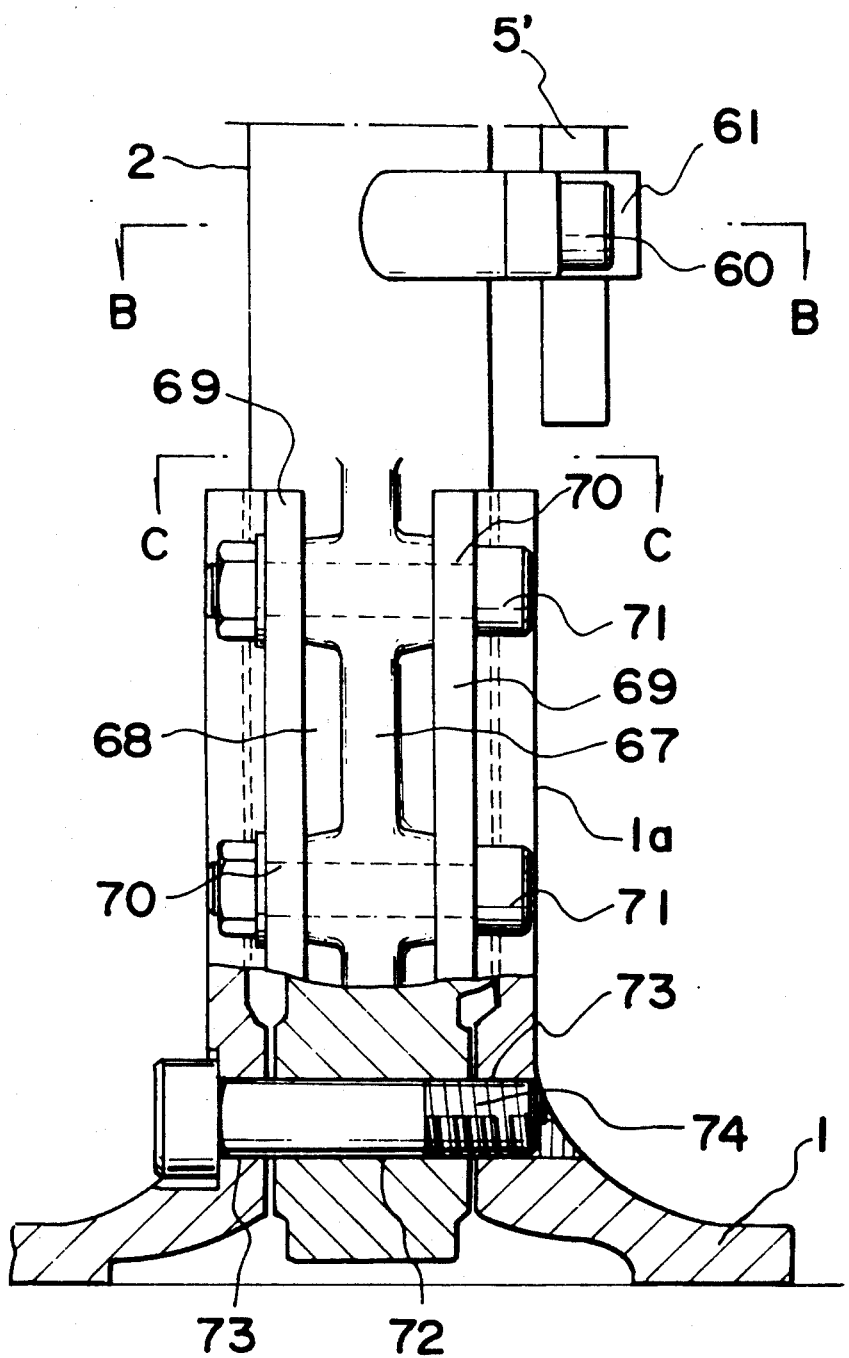
FIG. 7 is a partial longitudinal side elevational view in section of FIG. 6.

FIG. 6 is a front elevational view for showing one preferred embodiment of the present invention partly broken away. FIG. 7 is a side elevational view for showing a part of a substantial part in the preferred embodiment in FIG. 6 with partly broken away. In the installing, lower bracket 1 is fixed to the mounting surface. The outer tube 2 of the supporting column structure, separately constructed from the bracket, is inserted into the receiving cylinder 1a and is assembled to the cylinder.

This supporting column structure has the damper mechanism shown in FIG. 2, for example. The inner tube 3 of the hollow piston rod is fitted from the upper end of the outer tube 2 under the action of the damper mechanism in such a way as it may be directed upwardly and downwardly. The lower directed cylinder 4a of the upper bracket 4 for the seat is rotatably and closely fitted to the column part of the upper end cap 3a of the inner tube 3, and then the bolt 5' is suspended downwardly along the outer tube 2 from the expansion part of the cap 3a.

Figure 8:
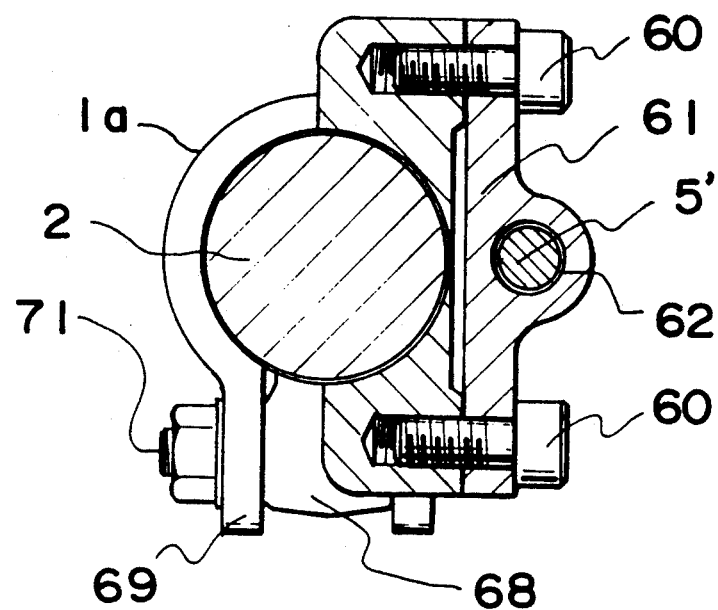
FIG. 8 is a top plan view in cross section taken along a line B—B of FIG. 7.
Figure 9:
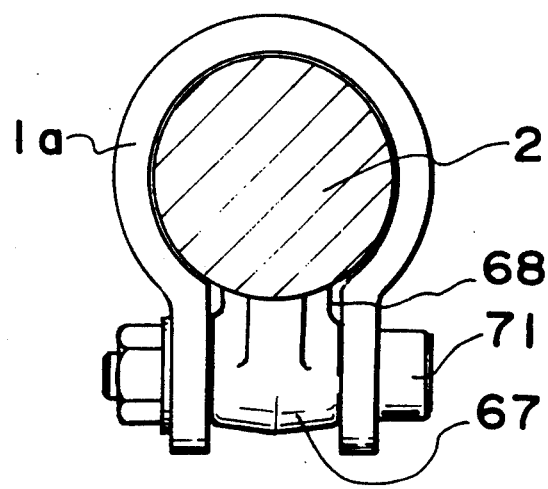
FIG. 9 is a top plan view in cross section taken along a line C—C of FIG. 7.

A free end of this bolt 5' is oscillatably inserted into a through-hole 62 of the guide 61 fixed to the upper outer circumference of the outer tube 2 by the bolts 60 and 60 as shown in FIG. 8 so as to constitute the rotation preventing mechanism for the outer tube 2 against the inner tune 3.

An operating knob 65 of the threaded shaft 64 threadably engaged with the threaded hole 63 is arranged at the lower directed cylinder 4a, the upper bracket 4 is integrally fixed to the inner tube 3 by fastening the threaded shaft 64 under a rotating operation of the knob 65. The operating knob 65 is rotated to be loosed and the upper bracket 4 is rotatably arranged in the inner tube 3. Under this condition, a swivelling angle of the seat is adjusted together with the bracket 4 and the direction of the seat can be fixed at the adjusting position by fastening again the operating knob 65.

In addition, the expansion ear piece 67 having assemblying holes 66 is provided at the lower outer circumference of the outer tube 2 in the supporting column structure. Longitudinal slit grooves 68 are arranged at a part of the circumferential wall of the receiving cylinder 1a in the lower bracket. The fastening bolts 71 are passed through the assemblying holes 70 and 70 of the brackets 69 and 69 expanded at both sides and the assemblying holes 66 and 66 of the ear piece 67 while these holes are coincided to each other. The bolt 74 carried by the receiving holes 73 and 73 opened at the bottom circumferential wall of the lower bracket 1 are passed through the supporting hole 72 in the lower end of the outer tube 2 and the supporting column structure is supported in an upward or downward direction.

In the present invention, the supporting column structure is not limited, and this can be constructed by employing a front fork of a bicycle. In this case, wheel fixing holes of the front fork are utilized as the supporting hole 72 of the outer tube 2, a brake caliper fixing part is used as the expansion ear piece 67 having the assemblying holes 66 and then the guide 61 is fixed by utilizing the fender fixing hubs.

According to the preferred embodiment having such a configuration as above, the supporting column structure is inserted into the receiving cylinder 1a of the installing lower bracket 1 while the longitudinal slit grooves 68 and the expansion ear piece 67 are aligned to each other in their circumferential directions. A load at the supporting column structure is received by supporting of the supporting hole 72 by a bolt 74 at the bottom position of the lower bracket 1 and in turn, the holding and fixing of the expansion ear piece 67 into the brackets 69 with bolts 71 may prevent the supporting column structure from falling toward a lateral direction and at the same time the outer tube 2 is made as an immovable member. The operating knob 65 is operated to adjust a direction of the seat under a prevention of rotation of the inner tube 3 with the bolt 5' connected to the tube 2 through the guide 61 and then an attenuation of vertical movement caused by the external striking of the seat is controlled by the damper mechanism installed within the supporting column structure.

Figure 10:
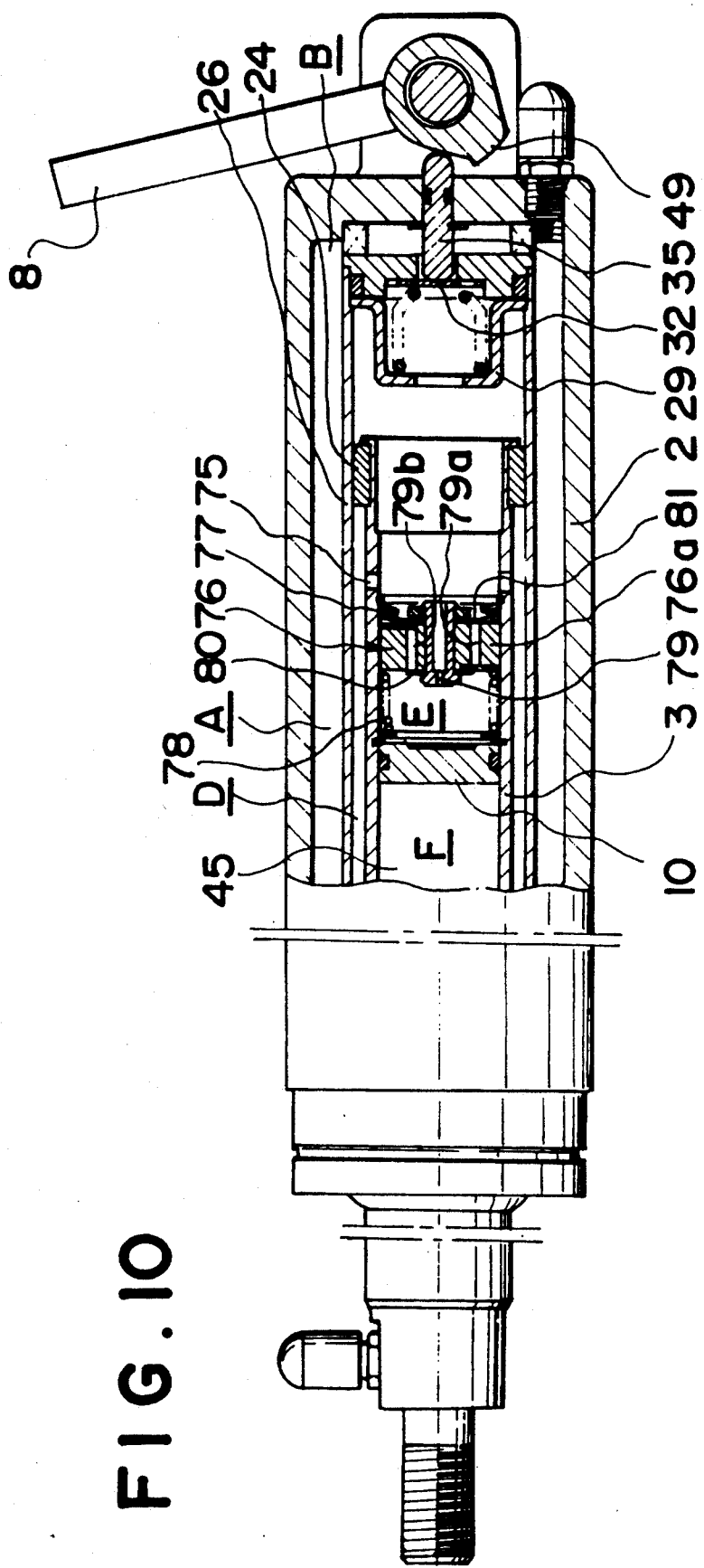
FIG. 10 is a front elevational view in longitudinal section for showing a supporting column structure of the seat damper of another preferred embodiment of the present invention.

Then, FIG. 10 shows a still further preferred embodiment of the present invention, wherein this FIGURE shows an attenuation force generating mechanism to be utilized in the seat damper shown in the preferred embodiments of FIGS. 1 and 6, and its actions and effects are the same as those of the preferred embodiment shown in FIG. 2.

An interior of the cylinder 26 is divided into an oil chamber C and an oil chamber D by a piston 24 and then the piston rod 3 of the inner tube is formed with communication holes 75 for always communicating the oil chambers C and D.

An attenuation valve 76 is arranged within the piston rod 3 adjacent to the oil chamber D and the oil chamber E is formed inside the piston rod 3 opposite to the oil chamber C with the attenuation valve 76 being held therebetween. In addition, within the piston rod 3 is formed a gas pressure chamber F with air sealingly enclosed therein contacting through the free piston 10, wherein the gas pressure chamber F may act as a resilient means for biasing the cylinder 26 and the piston 24 in an upward direction of a repelling one.

The attenuation valve 76 has a partition wall member 76a which can be moved up and down, an orifice 79 formed at the partition wall member 76a and two ports 79a and 79b.

The attenuation valve 76 is slidably fitted within a hollow part of the piston rod 3 and is resiliently supported by the piston rod 3 from the oil chamber C by a spring 77 and from the oil chamber E by a spring 78, respectively. In addition, a displacement of the attenuation valve 76 in each of its directions is restricted at the most-compressed positions of these springs 77 and 78.

The attenuation valve 76 is provided with an orifice 79 for always communicating the oil chambers C and E to each other, a compressing valve 80 for flowing an operating oil from the oil chamber C to the oil chamber E under a desired resistance and an expansion valve 81 for flowing out the operating oil from the oil chamber E to the oil chamber C under a desired resistance.

An outside part of the cylinder 26 is covered by the outer tube 2, and within an annular clearance between the outer tube 2 and the cylinder 26 are arranged the gas chamber A and the oil chamber B for use in adjusting the oil volume within the cylinder 26. Air is sealingly enclosed in the gas chamber A above the oil surface of the oil chamber B and the chamber is communicated with the inside part of the cylinder 26 through the leaf valve 32 opened or closed by the lever 8 from outside.

Operation of the preferred embodiment will be described.

Under a stationary state, a pressure of the compressed air in the gas pressure chamber F may act against the oil chamber E through the free moving piston 10 and also act against the oil chambers C and D through the orifice 79 and the communication hole 75. Due to this fact, the piston 24 is biased toward its expanded side under a difference of pressure receiving are between the oil chambers C and D and kept at a balanced position with the load acting against the piston rod 3.

As a compressing force is acted upon the piston 24 through the piston rod from this position, a pressure within the oil chamber C is increased and the operating oil may flow into the oil chamber D through aeration holes 75 and the oil chamber E through the orifice 79, respectively.

As a result, a pressure difference is generated at both sides of the orifice 79, the attenuation valve 76 may flex the spring 76 due to this pressure difference to cause it to be displaced toward the oil chamber E and then the piston 24 is slid within the cylinder 26 in a compressing direction. Since the oil chamber C may expand its volume by an amount corresponding to a displacement of this attenuation valve 76 and a flow rate of the orifice 79 is correspondingly reduced, the attenuation force at the compression generated at the orifice 79 is low. In addition, even in case of operation directed toward the expansion side, the spring 77 is similarly flexed and the attenuation valve 76 is displaced toward the oil chamber C, thereby the generated attenuation force is restricted as less as possible. Due to this fact, the piston 24 may be extended or retracted correspondingly in respect to a vibration with a small amplitude and then it may sufficiently absorb and attenuate the vibration.

To the contrary, if the attenuation valve 76 is fixed, the fine vibration is scarcely absorbed but is transmitted to the cylinder 26 due to the generated attenuation force of the orifice 79 rapidly increasing in respect to the operating speed of the piston 24.

In case of this seat damper, as the amplitude of vibration is increased, a displacement of the attenuation valve 76 is also increased. However, as the spring 78 enters the most compressed state, the attenuation valve 76 is restricted for its displacement and a flow rate at the orifice 79 is rapidly increased in respect to the compression displacement of the piston 24. Along with this operation, the generated attenuation force is rapidly increased. As the pressure difference between the oil chambers C and E exceeds the set value, the compression side valve 80 is opened and the operating oil is flowed from the oil chamber C to the oil chamber E. As the piston 24 is compressed, the free moving piston 10 may compress the gas pressure chamber F in order to accumulate the operation oil corresponding to the immersed volume of the piston rod 3 and then a spring load set by the compressed air is also increased.

When the piston 24 is expanded, the operating oil is flowed from the oil chambers D and E into the oil chamber C and the attenuation valve 76 is displaced toward the oil chamber C. However, as the spring 77 shows the most compressed state, further displacement of the attenuation valve 76 is limited, resulting in that the attenuation valve 76 may rapidly increase the generated attenuation force. Then, as the amplitude is further increased, the expansion side valve 81 is opened and the operating oil is flowed from the oil chamber E to the oil chamber C.

That is, the displacement of the attenuation valve 76 is limited, thereby the generated attenuation forces at an expansion side and a compression side are substantially increased to attenuate the vibration, resulting in that the piston 24 may not generate any striking against the bottom or a full expansion even in case of a high vibration is applied.

In this way, since a large vibration as well as a small vibration may efficiently accommodated, a comfortable feeling in riding can be attained.

As the supporting column structure, it is not restricted to one illustrated in the drawings, but it may also be applicable if the device is comprised of an outer tube and an inner tube movably inserted into the outer tube and attenuation force generating mechanisms are arranged within each of the tubes.

The present invention may provide the following effects.

1) The supporting column structure and the installing lower bracket are separated to each other and the supporting column structure inserted into the lower bracket is fastened by the fastening member, so that a standardization of this lower bracket causes the supporting column structures having different damper strokes to be in a form of cartridge and they are assembled or replaced in the common lower bracket to enable the damper to be replaced. The present invention has much versatility and has an easy maintenance and repair. In addition, the inner cylinder of the lower bracket does not require any precision secondary machining, such as a cylinder machining, resulting in that its machining cost can be reduced substantially.

2) Since the supporting column structure has an attenuation force generating mechanism and a height adjusting mechanism, some energies such as external striking and vibration or the like can be absorbed and damped and further the seat height can be optionally adjusted. In addition, the seat height adjustment and the absorption and damping of the striking force can be carried out with one supporting column structure, and an entire seat damper can be made light in weight and small in size and at the same time its cost can be reduced.

3) In case that as the attenuation force generating mechanism, the attenuation valve installed in the operating oil passage is resiliently supported in such a way as it may be displaced in a flowing direction, means for restricting the attenuation valve from being displaced more than that specified, so that as the operating oil passes through the attenuation valve, the attenuation valve is displaced and the generated attenuation force can be restricted to a low value so as to assist an accommodation of a vibration having a low amplitude and in turn, as the displacement of the attenuation valve is restricted, the generated attenuation force is increased and then a vibration having a high amplitude can be positively attenuated. Due to this fact, a high vibration accommodating capability can be attained irrespective of any value of amplitude.

What is claimed is:

1. A seat damper comprising:
   an outer tube;
   standardized lower bracket means for receiving and securely fastening a plurality of different types of said outer tube, said standardized lower bracket means having an adjustable collar support and shaft means for engaging a base of said outer tube;
   an inner tube positioned inside said outer tube;
   control valve means for adjusting a height of said inner tube with respect to said outer tube by controlling a flow of fluid into and out of said inner tube, said control valve being externally operated;
   attenuation means for damping movement between said inner tube and said outer tube, said attenuation means dividing said inner tube into first and second chambers and said attenuation means restricting a flow of fluid between said first and second chambers in order to cause said dampening.

2. A seat damper in accordance with claim 1, wherein:
   said standardized lower bracket means has a flange;
   said adjustable collar support has a ring with a wedge-like section made of resilient material, said ring being fastenable to said flange and said wedge-like section fitting between said standardized lower bracket means and said outer tube for tightly connecting said outer tube to said standardized lower bracket means;
   link brackets on an end of said outer tube engaging with said shaft means.

3. A seat damper in accordance with claim 1, further comprising:
   a damper cylinder between said outer tube and said inner tube, said damper cylinder forming a third chamber between said damper cylinder and said outer tube, said damper cylinder also forming a portion of said second chamber; and
   said control valve means controlling said fluid flow between said second chamber and said third chamber.

4. A seat damper in accordance with claim 1, wherein:
   said control valve means has a check valve with an operating rod movably arranged in opposition to said check valve for opening and closing said check valve; and
   said shaft means rotatably supporting a cam interacting with said operating rod; and
   lever means for rotating said shaft means.

5. A seat damper in accordance with claim 1, further comprising:
   an upper bracket attached to said inner tube;
   a bolt extending from said upper bracket and along said outer tube; and
   a ring-like guide means for slidably engaging said bolt and holding said bolt in either a rotational or non-rotational state about said outer tube, said ring-like guide means itself being either in one of a rotational and non-rotational state.

6. A seat damper in accordance with claim 1, wherein:
   said plurality of different types of said outer tube are a standard diameter regardless of other characteristics;
   said standardized lower bracket means has a receiving cylinder shaped to receive said different types of said outer tube having said standard diameter.

7. A seat damper comprising:
   an inner tube;
   a damper cylinder surrounding said inner tube;
   attenuation means for damping movement between said inner tube and said damping cylinder, said attenuation means positioned inside said inner tube and dividing said inner tube into a first chamber and a second chamber, said damper cylinder defining a portion of said second chamber, said attenuation means restricting flow between said first chamber and said second chamber for said damping of said movement between said inner tube and said damping cylinder;

an outer tube surrounding said damping cylinder, said outer tube and said damping cylinder defining a third chamber surrounding said damping cylinder;

control valve means for adjusting position of said inner tube with respect to said damping cylinder by controlling a flow of fluid between said third chamber and said second chamber;

a first compressed gas reservoir in said first chamber forming a gas spring;

a second compressed gas reservoir in said third chamber forming a gas spring;

a piston between said inner tube and said damping cylinder, said piston fixed on an end of said inner tube, said inner tuber and said damping cylinder defining a fifth chamber surrounding said inner tube, said fifth chamber communicating with said second chamber through said attenuation means and a port defined by said inner tube; and a lower bracket defining a receiving support cylinder for receiving said outer tube.

8. A seat damper according to claim 7 characterized in that the fastening member is comprised of an expansion ear arranged at an outer circumference of the outer tube, a pair of brackets arranged at the lower bracket and fastening bolts passing between said ear piece and the bracket, the ear piece is inserted between the brackets and the ear piece is held by brackets at both sides through the fastening bolts.

* * * * *